Aug. 15, 1939. D. HOPPENSTAND 2,169,733
FREEZING TRAY
Filed Aug. 13, 1935
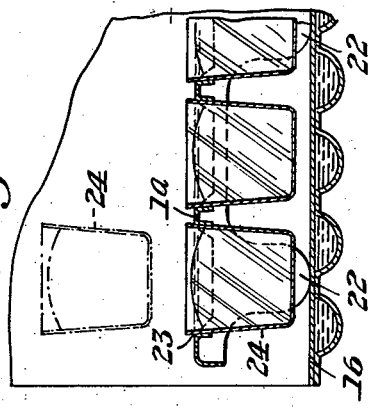
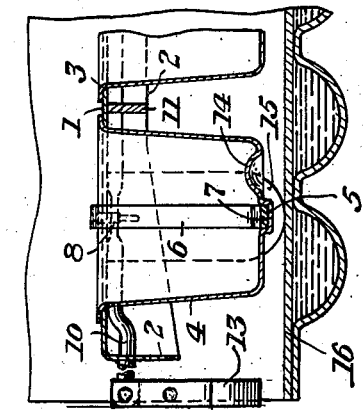
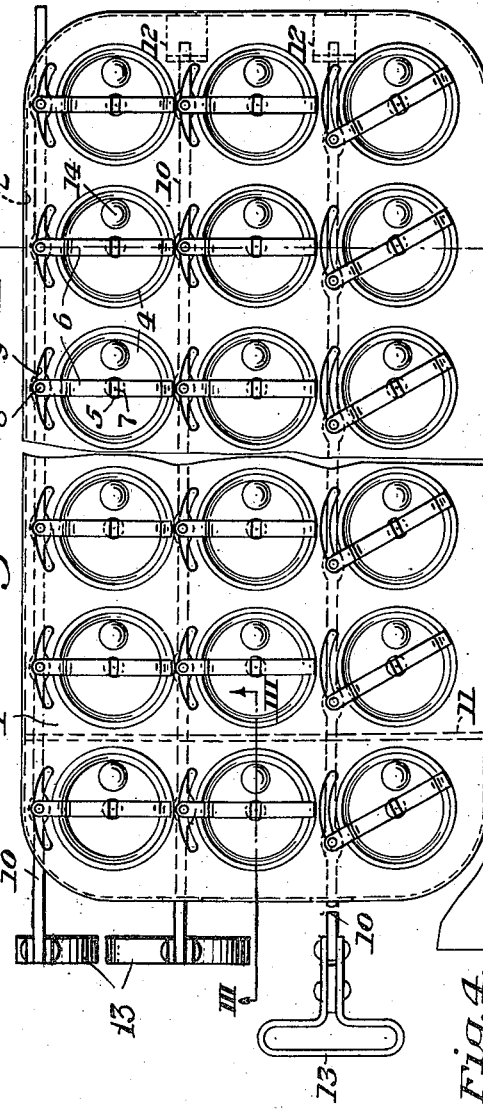
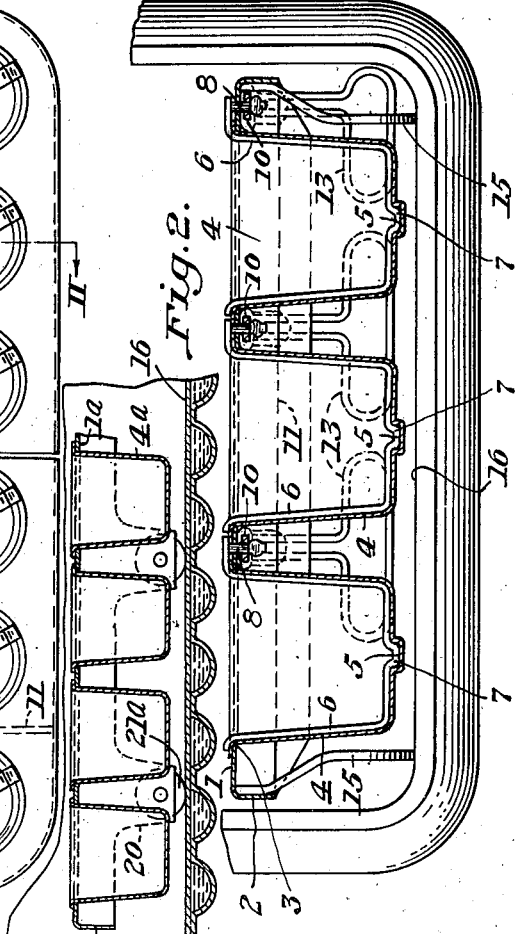
INVENTOR
David Hoppenstand
BY John R. Keller
ATTORNEY Patented Aug. 15, 1939

2,169,733

UNITED STATES PATENT OFFICE 2,169,733

FREEZING TRAY

David Hoppenstand, Glenshaw, Pa., assignor to Hopkan Rivet Company, Inc., Pittsburgh, Pa., a corporation of Pennsylvania Application August 13, 1935, Serial No. 35,944

3 Claims. (Cl. 62—108.5)

This invention relates to trays such as are employed in the freezing chambers of domestic refrigerators for making ice. Considerable difficulty is experienced in removing ice from trays of the types now employed and while numerous efforts have been made to overcome this difficulty, none of them, to my knowledge, has been entirely successful. It is an object of my invention therefore, to provide a freezing tray of such construction that the ice frozen therein can be freed for use quickly and easily.

My invention may be clearly understood from the following description thereof, taken in connection with the accompanying drawing in which Fig. 1 is a plan view; Fig. 2 is a transverse sectional view along line II—II of Fig. 1; Fig. 3 is a partial, longitudinal sectional view along line III—III of Fig. 1; and Fig. 4 is a view similar to Fig. 3 showing a modified form of the invention; and Fig. 5 is also a view similar to Fig. 3 showing a further form of the device.

In the form shown in Figs. 1-3, my freezing tray comprises a top sheet 1 having a downturned edge rim 2 and a plurality of holes 3 punched therein. Frusto-conical cups 4 are seated in the openings 3 and secured in any suitable manner to sheet 1. Depressions 5 are formed in the bottoms of the cups, centrally thereof, to provide bearings for ice-removal members 6 movably supported in the cups. These members may be of any desired shape but as shown comprise flat strips bent to substantially U shape, to conform to the section of the cups. Each member has a bearing point 7 pressed therein to cooperate with the bearing depressions 5.

Each member 6 has a pin 8 projecting downwardly from one end thereof and adapted to enter a slot 9 formed in the sheet 1 adjacent each of the holes 3. Operating bars 10 for the members 6 are reciprocably supported on a transverse bearing strip 11 and bearing brackets 12. The bars are flattened at intervals and punched to receive the pins 8 which are then upset or flattened to secure them to the bars. Each bar has an actuating handle 13 pivoted thereto whereby all the members 6 secured to any bar may be operated simultaneously. By reciprocation of the bars, all the members 6 secured thereto will be rotated to the extent permitted by the length of the slots 9. Each cup 4 has a raised portion 14 in the bottom thereof to assist in removing from the cup a piece of ice frozen therein, when rotated with the member 6.

Legs 15 extend downwardly from the top sheet 1 to support the tray as a whole in spaced relation to the floor of a refrigerator freezing chamber indicated diagrammatically at 16. It will be observed that the tray thus comprises a supporting and spacing frame including the top sheet and the legs, with individual molds so disposed thereon that their entire peripheral surfaces are subject to the cooling action of the freezing chamber.

In use the cups of the tray are filled with water to be frozen and the tray is placed in the freezing chamber after the handles 13 have been folded down against the end of the tray. The tray is supported on the feet or legs 15 so it does not adhere to the floor of the chamber and can be easily removed when the water in the cups is frozen. Lifting of the handles 13 accompanied by a pull thereon will cause the members 6 attached to the particular bar 10 being operated to rotate. This operation will be greatly facilitated by exposing the tray to room temperature for a few moments. Since the entire peripheral surface of each cup is thus subject to a temperature considerably above freezing, the ice frusta in the cups are almost immediately thawed loose therefrom and a light pull on the bars 10 is sufficient to rotate the members 6 and with them the ice. Rotation of the ice masses in the cups finally frees them therefrom, aided by the lifting action of the raised portions 14 in the bottoms of the cups.

In a modified form of the invention shown in Fig. 4, I rely entirely on the rapid thawing of the ice from the cups, caused by the contact of air at room temperature with the exterior surface of the cups. In Fig. 4, a top sheet 1a is provided with cups 4a similar to the arrangement shown in Figs. 1-3. The downturned rim 2a of the top sheet provides bearings 20 for rollers 21a adapted to support the tray in the freezing chamber 16. This form of the invention is characterized by the same advantage as that already described, viz., free access of cold air to the surface of the cups for freezing, and of atmospheric air for thawing the ice rapidly from the cups.

Fig. 5 shows a further form of the invention in which a top sheet 1a with supporting legs 22 has holes 23 punched therein for removably receiving cup molds 24. The latter may be of any convenient shape. When filled with water and frozen, the cups may be removed individually and used, for certain purposes such as packing around bottles to cool them, either with the ice therein or the ice may be removed from the cups by giving them a smart blow or rap on a solid surface. The exposure of the surfaces of the cups to air at room temperature serves to free the ice therein very quickly. In this connection, the handles of the device of Figs. 1-3 must be given a hard blow to free the ice therein unless the cups can be exposed to room temperature for a fraction of a minute, after which a correspondingly easier blow will be sufficient to free the ice. It will be noted that the cups are supported free of the floor of the freezing chamber in all forms of the invention.

It will be apparent that the invention provides a freezing tray from which ice frozen therein can be removed readily without loss of time. The device of Figs. 1-3, furthermore, serves to elevate the freed ice for easy removal, by means of the raised portions 14.

Although I have disclosed herein only a few of the possible forms of the invention, others will no doubt occur to those skilled in the art.

I claim:

1. An ice mold comprising a plurality of cups adapted to receive water to be frozen, means for supporting said cups in spaced relation, a member rotatably mounted in each cup, and other means for raising a mass of ice frozen in each cup when the rotatable member thereof is rotated.

2. An ice mold comprising a plurality of cups adapted to receive water to be frozen, means for supporting said cups in spaced relation, a member rotatably mounted in each cup for removing a mass of ice frozen therein, a longitudinally reciprocable bar and pin connections between the bar and each of a plurality of the rotatably mounted members for simultaneously rotating them.

3. An ice mold comprising a set of cups held in spaced apart relation and adapted to receive a liquid to be frozen, an element mounted for movement longitudinally of said set, members pivoted to said element and each projecting into one of said cups and having a portion in position therein to be embedded in a block of ice formed therein, and means connected to said element to move same for simultaneously rotating said members and thereby break the bond between each cup and the ice frozen therein.

DAVID HOPPENSTAND.